Sept. 8, 1959 W. C. BIEDERMANN ET AL 2,903,516

RADIO RECEIVER CONSTRUCTION

Filed Jan. 14, 1957

INVENTORS.
William C. Biedermann,
BY Lester C. Gutschick,
Mueller & Aichele
Attys.

United States Patent Office 2,903,516

Patented Sept. 8, 1959

2,903,516

RADIO RECEIVER CONSTRUCTION

William C. Biedermann, Des Plaines, and Lester C. Gutschick, Morton Grove, Ill., assignors to Motorola, Inc., Chicago, Ill., a corporation of Illinois Application January 14, 1957, Serial No. 633,880

1 Claim. (Cl. 179—1)

This invention relates generally to radio receiver constructions, and more particularly to the mounting of a loudspeaker on the chassis panel of a radio receiver or the like.

It is common practice in the construction of radio receivers to provide a chassis which may be an insulating panel having conductors provided thereon with various circuit elements mounted on the panel and connected in circuits by soldering to the conductors. After the soldering operation, the chassis may be tested prior to assembly in a housing. In many radio receivers, the loudspeaker is mounted in the cabinet or housing rather than on the chassis so that a test loudspeaker must be connected in order to test the chassis. Then the unit must be further tested after the chassis is installed in the cabinet and connected to the loudspeaker therein. This requires connection of the parts after mounting thereof in the cabinet, and a duplication of testing causing added expense.

It is, therefore, an object of the present invention to provide a radio receiver having an improved construction for mounting the loudspeaker thereof on the radio receiver chassis.

It is another object of the invention to provide a loudspeaker mounting for holding a loudspeaker in position on a chassis prior to connection of the speaker terminals to conductors on the chassis, as by soldering.

A feature of the invention is the provision of a snap-in loudspeaker mounting wherein a loudspeaker includes mounting terminals adapted to be received in openings in a chassis, with the terminals being displaced with respect to the openings so that they must be sprung for insertion in the opening. The terminals and openings may have notched portions for providing interlocking engagement when the terminals are in place in the openings.

Another feature of the invention is the provision of a loudspeaker having terminals for supporting the same and connecting the loudspeaker in a circuit, with the terminals being soldered to conductors on a chassis for providing a structural mounting and electrical connection of the terminals to the chassis. The connection of the loudspeaker serves to strengthen the chassis and make the same more rigid.

Further objects, features, and the attending advantages of the invention will be apparent from a consideration of the following description when taken in connection with the accompanying drawings in which.

In practicing the invention there is provided a radio receiver chassis which may include an insulating board on which conductors are provided by printing, plating, or the like. The board includes T-shaped openings for receiving terminals of a loudspeaker. The terminals have recessed portions so that a snap-in mounting is provided with interlocking portions of the terminals and the openings forming a secure mounting for the loudspeaker. Three terminals are provided on the loudspeaker frame to provide the advantages of a three point support. The terminals are thereafter soldered to the conductors about the openings to provide a permanent mounting for the loudspeaker. Accordingly, the loudspeaker is mounted on the chassis during the soldering operation and the entire receiver is completed to such a point that it may be tested with the loudspeaker mounted on the chassis and connected thereto. The rigid connection of the loudspeaker frame to the chassis also serves to physically strengthen the chassis.

Figures 1, 2, 4:
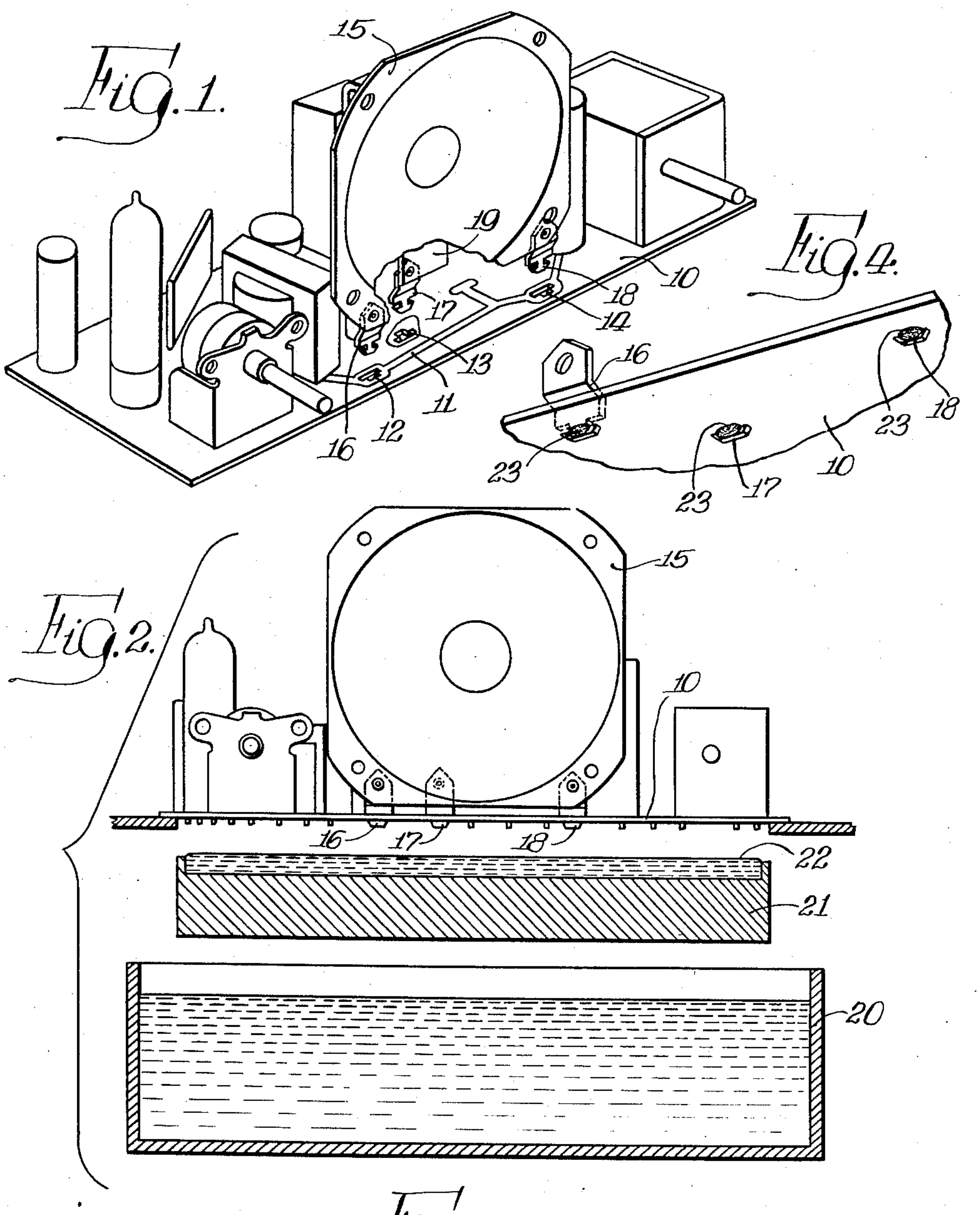
Fig. 1 is an exploded view of the loudspeaker and chassis in accordance with the invention.
Fig. 2 illustrates the soldering of the loudspeaker terminals to the chassis.
Fig. 4 is an enlarged perspective view showing the bottom of the chassis after soldering.

Referring now to the drawings, in Fig. 1 there is illustrated a radio receiver chassis 10 having various components mounted thereon. The chassis may be formed by an insulating board with conductors 11 provided thereon. Openings 12, 13, and 14 are provided in the panel with the conductors extending about the opening. The conductors may extend through the opening to the other side of the panel. The loudspeaker 15 includes terminals 16, 17, and 18 positioned to be inserted in the openings 12, 13, and 14 respectively. The openings are of T-shaped configuration and the terminals have reduced portions forming a neck. A terminal may be inserted through the wide portions of the T-shaped opening and then moved so that the neck of the terminal fits in the base of the T of the opening. As clearly shown in Figs. 1, 2, and 4, the neck of the terminal is between upper and lower shoulder portions with the lower shoulder portion wider than the neck of the terminal and the base of the opening with the upper shoulder portion being wider than the wide portion or cross bar of the opening.

The openings 12 and 14 are aligned adjacent the edge of the chassis panel 10, and the opening 13 is spaced from the edge of the panel and between the aligned apertures. The spacing of the terminal 17 from a line interconnecting terminals 16 and 18 is greater than that of the opening 13 with respect to the line connecting openings 12 and 14. Accordingly, the terminals must be sprung or bent toward each other for insertion through the openings and then will flex away from each other. The bases of the T-shaped openings extend in opposite directions so that when the terminals are freed, the neck portions of the terminals move into the base or narrow parts of the openings. The interlocking connection so provided will hold the loudspeaker quite rigidly on the chassis. This support of the speaker is adequate to hold the same on the chassis as it is moved from one position to another during the assembling operation.

Fig. 2 illustrates the loudspeaker 15 mounted on the chassis 10 in position for soldering of the terminals 16, 17, and 18 to the conductors on the chassis. A container 20 holds molten solder and a tray 21 may be moved upward from the container for raising molten solder 22 into contact with the terminals 16, 17, and 18. Accordingly, the terminals can be soldered to the chassis to provide good electrical connection between the terminals and the conductors on the chassis and at the same time provide the required structural mounting for the loudspeaker so that it is firmly held on the chassis. As previously stated, this connection also serves to increase the strength of the chassis and make it more rigid.

Figure 3:
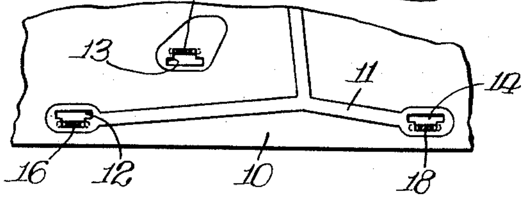
Fig. 3 is a cross-sectional view illustrating the chassis and loudspeaker terminals.

Fig. 3 is a cross-sectional view at the top surface of the chassis panel showing the conductors 11 and the terminals 16, 17, and 18 in the openings 12, 13, and 14 respectively. It will be noted that the conductors about the openings 12 and 14 are inter-connected and these conductors form one electrical connection to the loudspeaker. A second electrical connection to the loudspeaker is provided by the conductor about opening 13 which is connected to the terminal 17. Only two electrical connections are required to the loudspeaker whereas a three-point structural connection of the loudspeaker provides the required rigidity. The use of two electrical connections to one terminal of the speaker adds substantially no additional cost and insures a good electrical connection. The terminals 16 and 18 may be connected to the main frame of the loudspeaker and the terminals 17 may be supported on an insulating board 19 connected to the loudspeaker frame. The terminal 17 is then electrically connected to one end of the loudspeaker coil with the other end being connected to the loudspeaker frame.

Fig. 4 is a bottom view showing the soldered connections 23 on the underside of the chassis. The solder will actually flow up through the openings in the chassis and make a good connection between the terminals on the chassis throughout the entire thickness of the chassis. As previously stated, the conductors may extend through the openings to both sides of the panel so that a very good electrical connection is made and the structural connection is also very secure.

The construction in accordance with the invention is relatively inexpensive since only three simple snap-in terminals are required on a standard loudspeaker. The terminals can be very easily snapped into the chassis and then hold the loudspeaker firmly in position prior to soldering of the terminals. This greatly simplifies the assembling operation. The terminals are then soldered during the same operation in which other connections are soldered, so that a separate connecting operation is not required. This permits the entire receiver to be tested with the loudspeaker operating and a separate testing operation is not required. The chassis and loudspeaker may thereafter be mounted in a cabinet or housing and no further electrical connections are required since the loudspeaker is already connected in the circuit. The loudspeaker strengthens the chassis and may also be used as one means of connecting the chassis to the cabinet. This construction has been found to be highly advantageous as it simplifies the manufacturing process and has also provided entirely satisfactory operation in actual use.

We claim:

An electronic circuit chassis assembly including in combination, a printed circuit panel, a plurality of electronic components supported on said panel, said panel having three apertures therein with electrical connections extending about at least two of the apertures for a loudspeaker, two of said apertures being aligned adjacent one edge of said panel and one aperture being spaced from said one edge and positioned generally between said aligned apertures, said apertures being T-shaped with the base of the T of said one aperture extending in the opposite direction to the base of the T of the aligned apertures, a loudspeaker having three connection lugs for insertion into said apertures, said lugs each having a neck portion between upper and lower pairs of shoulders, said lower pair of shoulders being of a size to fit into the cross-arm of the T-shaped apertures but wider than the base thereof, the upper pair of shoulders being wider than the aforesaid cross-arm and said neck portion being of a size to fit the aforesaid base, with two lugs insertable into said aligned apertures and a third lug out of alignment and being bendable to fit said one aperture so that a spring tension is developed in said lugs to secure said loudspeaker on said panel with the thickness of said panel extending between upper and lower shoulders of said lugs, so that said chassis may be moved during soldering operations without disturbing the alignment of said speaker with respect to said panel.

References Cited in the file of this patent

UNITED STATES PATENTS 2,740,027 Budd et al. ............ Mar. 27, 1956